United States Patent
Otagaki et al.

(10) Patent No.: US 10,816,497 B2
(45) Date of Patent: Oct. 27, 2020

(54) METHODS AND APPARATUS FOR A CAPACITIVE SENSOR

(71) Applicant: SEMICONDUCTOR COMPONENTS INDUSTRIES, LLC, Phoenix, AZ (US)

(72) Inventors: Takayasu Otagaki, Ota (JP); Kensuke Goto, Ashikaga (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 77 days.

(21) Appl. No.: 16/255,945

(22) Filed: Jan. 24, 2019

(65) Prior Publication Data
US 2020/0240944 A1    Jul. 30, 2020

(51) Int. Cl.
  G01N 27/22    (2006.01)
  G01W 1/00    (2006.01)
(52) U.S. Cl.
  CPC ............ G01N 27/223 (2013.01); G01W 1/00 (2013.01)
(58) Field of Classification Search
  CPC ............................. G01N 27/223; G01W 1/00
  USPC ........................................................ 324/665
  See application file for complete search history.

(56) References Cited

U.S. PATENT DOCUMENTS

| 3,279,249 | A | * | 10/1966 | Tocanne | E21B 47/113 73/152.31 |
| 3,515,987 | A | * | 6/1970 | Zurbrick | G01N 27/223 324/687 |
| 5,682,788 | A | * | 11/1997 | Netzer | B32B 17/10036 318/444 |
| 6,094,987 | A |  | 8/2000 | Hochstein |  |
| 2008/0222827 | A1 | * | 9/2008 | Veerasamy | B60S 1/0825 15/250.12 |
| 2009/0039901 | A1 |  | 2/2009 | Delatte |  |
| 2013/0113544 | A1 | * | 5/2013 | Salter | B60R 16/005 327/517 |
| 2015/0143881 | A1 | * | 5/2015 | Raut | G01R 35/00 73/73 |
| 2015/0219581 | A1 | * | 8/2015 | Santangelo | G01N 27/227 73/335.04 |

FOREIGN PATENT DOCUMENTS

| EP | 0960346 A1 | 12/1999 |
| EP | 1686026 A1 | 8/2006 |
| EP | 2870037 A1 | 5/2015 |
| JP | 20000075052 A | 3/2000 |
| JP | 2010106115 A | 7/2010 |

* cited by examiner

Primary Examiner — Christopher P McAndrew
(74) Attorney, Agent, or Firm — The Noblitt Group, PLLC; Hettie L. Haines (57) ABSTRACT

Various embodiments of the present technology may provide methods and apparatus for a capacitive sensor configured to detect rain. The capacitive sensor may provide a reception electrode in communication with a drive electrode to form an electric field and a ground electrode surrounding the reception and drive electrodes. The ground electrode may couple the rain to a ground potential resulting in a decrease in the capacitance of the capacitive sensor.

20 Claims, 8 Drawing Sheets

METHODS AND APPARATUS FOR A CAPACITIVE SENSOR

BACKGROUND OF THE TECHNOLOGY

Capacitive sensors operate by detecting changes in the capacitance formed between a transmission electrode and a sense electrode. The degree of change in the capacitance may indicate various conditions, such as proximity, touch, pressure, and the like.

In some environments, it may be desired to detect a weather condition, such as rain on a windshield. In such a case, feedback from the capacitive sensor may indicate a raining condition, and in such a case, the feedback may be used to perform automated control of windshield wipers. Conventional sensors used to detect weather conditions, however, may experience varying levels of accuracy and sensitivity depending on the location of the sensor on the windshield.

SUMMARY OF THE INVENTION

Various embodiments of the present technology may provide methods and apparatus for a capacitive sensor configured to detect rain. The capacitive sensor may provide a reception electrode in communication with a drive electrode to form an electric field and a ground electrode surrounding the reception and drive electrodes. The ground electrode may couple the rain to a ground potential resulting in a decrease in the capacitance of the capacitive sensor.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, drivers, switching devices, current sources, voltage sources, logic gates, semiconductor devices, such as transistors, capacitors, and the like, which may carry out a variety of functions. In addition, the present technology may be integrated in any number of electronic systems, such as automotive, aviation, "smart devices," portables, "white goods," and consumer electronics, and the systems described are merely exemplary applications for the technology.

Figure 1A:
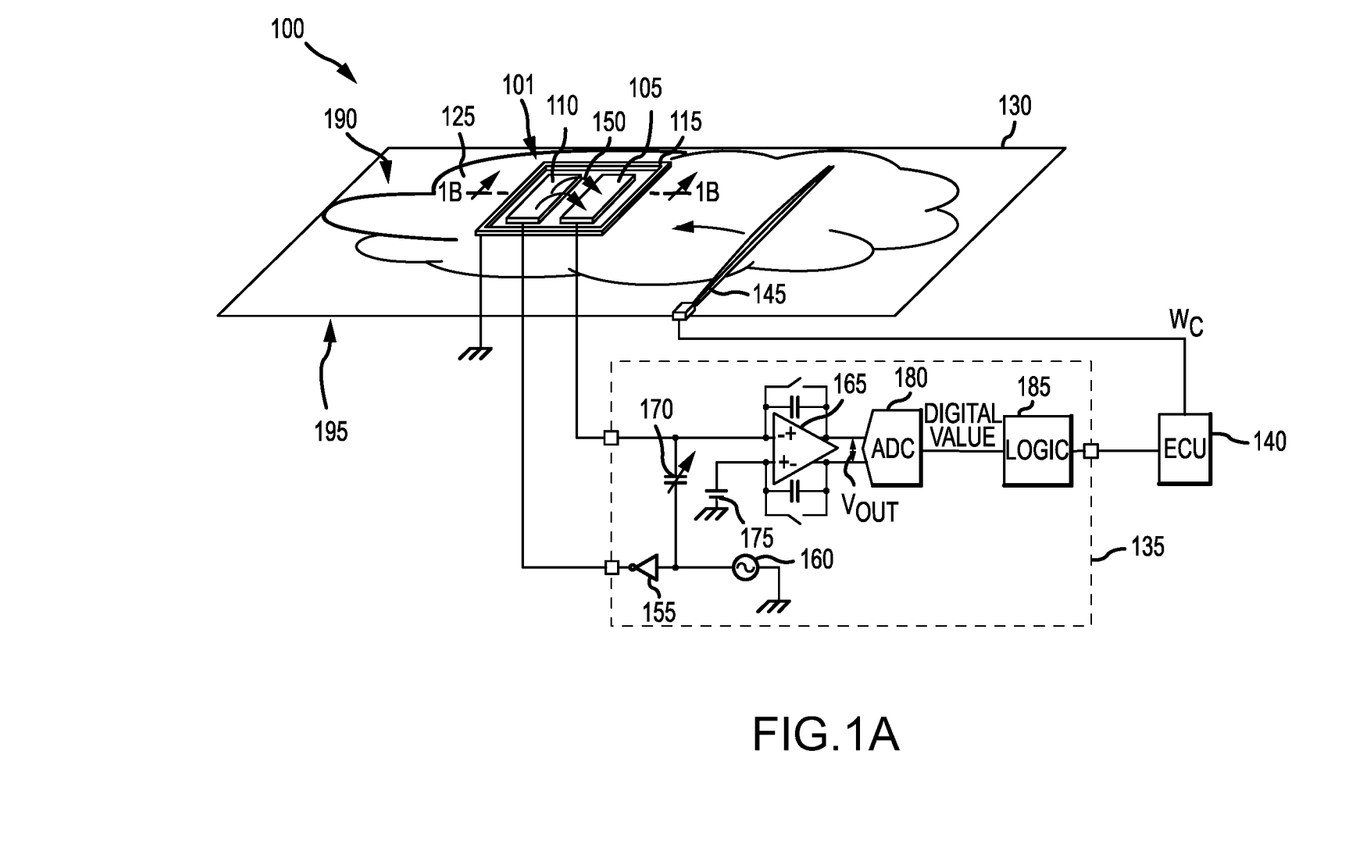
FIG. 1A representatively illustrates a system featuring a capacitive sensor in accordance with various embodiments of the present technology.
Figure 1B:
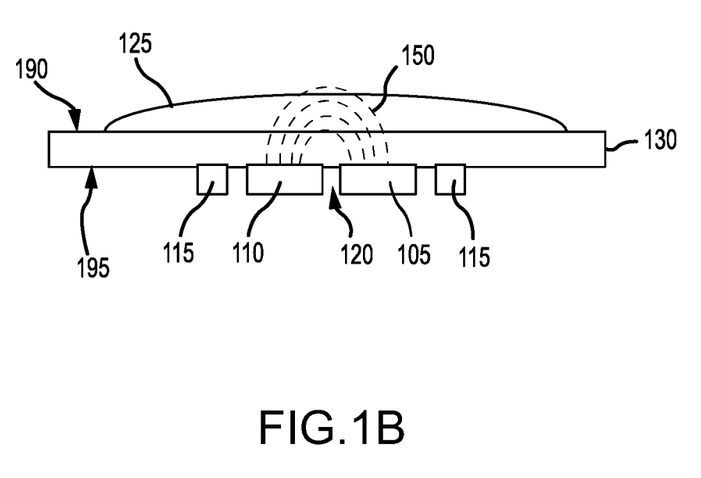
FIG. 1B is a cross-sectional view of the capacitive sensor of FIG. 1 in accordance with various embodiments of the present technology.

Referring to FIGS. 1A-1B, an exemplary system 100 may be integrated in a vehicle (not shown) and configured to detect the presence of a substance 125 in a particular weather condition, such as rain, ice, and snow, on a surface (such as a windshield 130) of the vehicle. For example, the system 100 may comprise a capacitive sensor 101, a sensing circuit 135, and an electronic control unit (ECU) 140. The system 100 may be further configured to utilize information from the capacitive sensor 101 to automatically control or otherwise operate a windshield wiper 145. The windshield wiper 145 may comprise any suitable wiper used to remove debris and/or a weather substance, such as rain, from the windshield 130.

The capacitive sensor 101 may be configured as a mutual capacitance sensor. For example, the capacitive sensor 101 may comprise a first electrode 105 in communication with a second electrode 110 and separated by a gap 120. The first and second electrodes 105, 110 may be configured to form an electric field 150, such that one electrode operates as a drive electrode and the remaining electrode operates as a reception electrode. The first and second electrodes 105, 110 may be formed using a conductive material, such as metal. Either one of the first and second electrodes 105, 110 may be connected (either directly or indirectly) to a power source 160 that pulses between two voltage levels to generate a drive signal, while the remaining electrode is connected to a variable capacitor 170. For example, either one of the first and second electrodes 105, 110 may be connected directly to the power source 160 or connected to the power source via an inverter 155. Accordingly, the electrode that is connected to the power source 160 may be referred to as the drive electrode and the electrode that is connected to the variable capacitor 170 may be referred to as the reception electrode.

The capacitive sensor 101 may further comprise a third electrode 115 connected to a ground potential. The ground potential may comprise an actual ground, rather than a "floating ground" or a "virtual ground." According to various embodiments, the third electrode 115 may be positioned adjacent to and planar with the first and second electrodes 105, 110.

According to various embodiments, the first, second, and third electrodes 105. 110, 115 may be formed on an upward-facing horizontal surface of a substrate (not shown), such as a flexible plastic substrate or a printed circuit board.

Referring to FIG. 1B, the capacitive sensor 101 may be affixed to an interior side 195 of the windshield 130—in other words, the side facing into a cabin of the vehicle. According to various embodiments, the capacitive sensor 101 may generate an electric field 150 that extends between the first and second electrodes, through the windshield 130, and above an outer surface 190 of the windshield 130.

In another application, the capacitive sensor 101 may be affixed to the outer surface 190 of the windshield 130, wherein the capacitive sensor 101 makes direct contact with the rain, ice, or snow.

In yet another application, the capacitive sensor 101 may be integrated into the windshield 130.

Figure 2:
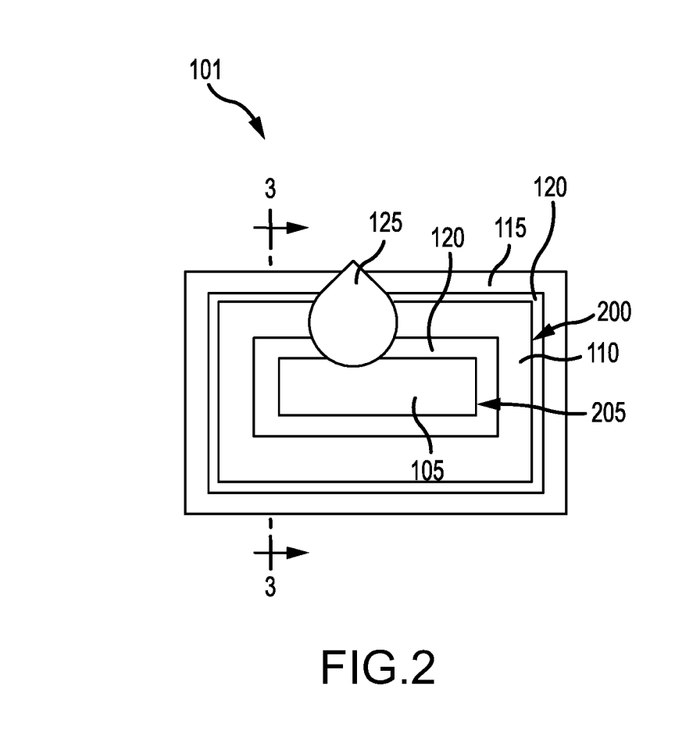
FIG. 2 representatively illustrates a top view of a capacitive sensor in accordance with a first embodiment of the present technology.
Figure 3:
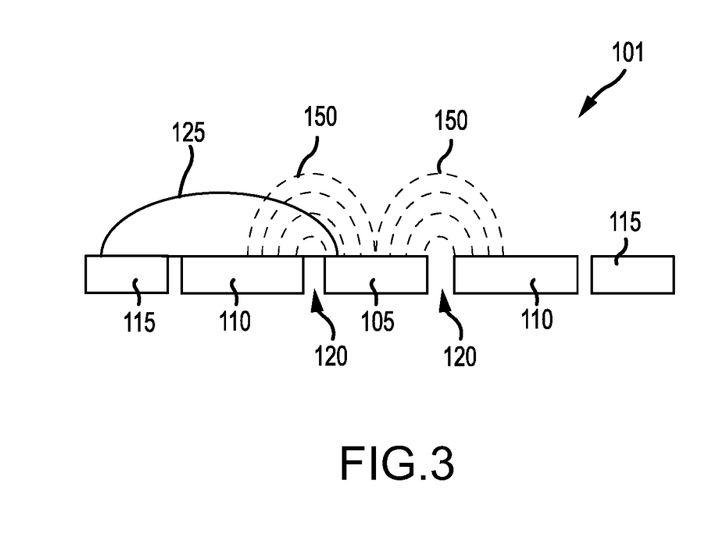
FIG. 3 representatively illustrates a cross-sectional view of the capacitive sensor of FIG. 2 in accordance with the present technology.

In a first embodiment, and referring to FIGS. 2 and 3, the first, second, and third electrodes 105, 110, 115 of the capacitive sensor 101 may be arranged as concentric with each other, and may be in the shape of squares, circles, or any other suitable shape. According to the present embodiment, the first, second, and third electrodes 105, 110, 115 are also planar with each other. In addition, due to the concentric pattern, the second electrode 110 is directly adjacent to and surrounds an outer perimeter 205 of the first electrode 105, and the third electrode 115 is directly adjacent to and surrounds an outer perimeter 200 (i.e. outer edge) of the second electrode 110. In other words, the second electrode 110 is nested within an interior space defined by the third electrode 115, and the first electrode 105 is nested within an interior space defined by the second electrode 110. The first, second, and third electrodes 105, 110, 115 may be situated on a single continuous surface, such as the horizontal surface of the substrate or the windshield 130.

According to the present embodiment, the first electrode 105 may operate as the reception electrode, the second electrode 110 may operate as the drive electrode, and the third electrode 115 may be connected to the ground potential.

Figure 4:
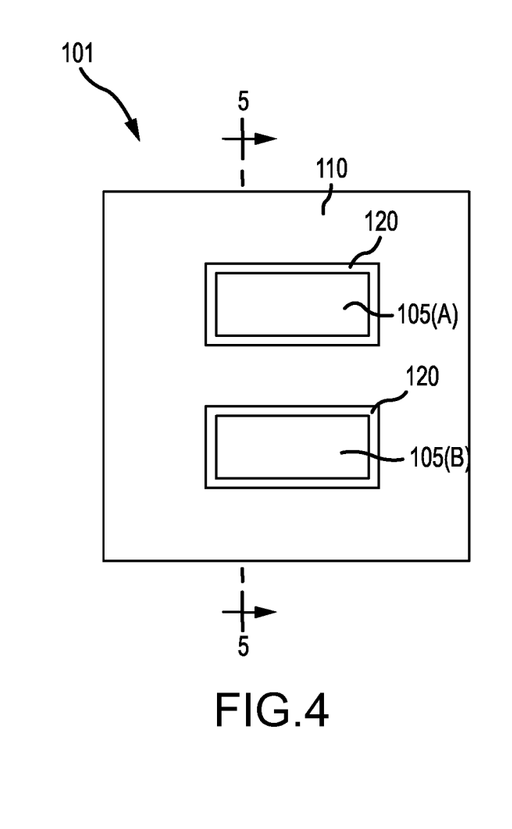
FIG. 4 representatively illustrates a top view of a capacitive sensor in accordance with a second embodiment of the present technology.
Figure 5:
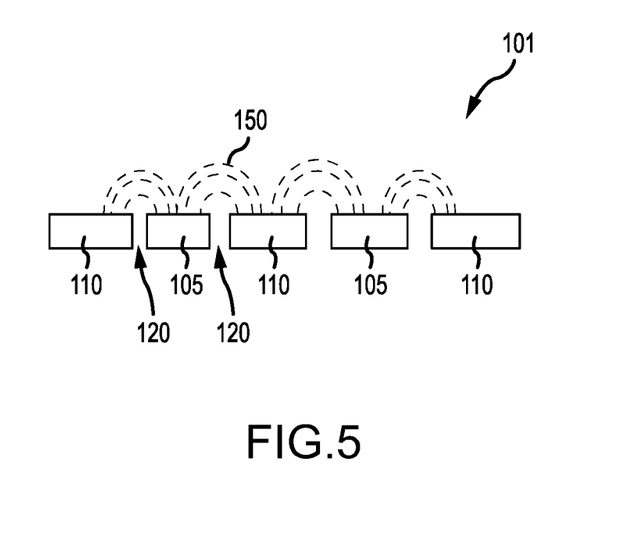
FIG. 5 representatively illustrates a cross-sectional view of the capacitive sensor of FIG. 4 in accordance with the present technology.

In a second embodiment, and referring to FIGS. 4 and 5, the capacitive sensor 101 may comprise a plurality of first electrodes, such as first electrodes 105(A), 105(B), surrounded by and directly adjacent to the second electrode 110. In other words, the first electrodes 105(A), 105(B) are nested within a space defined by the second electrode 110. According to the present embodiment, the first electrodes 105(A), 105(B) may operate as both the reception electrode and the ground. For example, one of the first electrodes (e.g., first electrode 105(A)) may operate as the reception electrode, the second electrode 110 may operate as the drive electrode, and a different first electrode (e.g., first electrode 105(B)) may operate as the ground. The operation of the plurality of first electrodes 105(A), 105(B) may switch periodically, such that at a first time, one of the first electrodes (e.g., first electrode 105(A)) operates as the reception electrode while the remaining first electrode (e.g., first electrode 105(B)) operates as the ground. At a second time, a different first electrode (e.g., first electrode 105(B)) operates as the reception electrode while the remaining first electrode (e.g., first electrode 105(A)) operates as the ground.

In addition, the first and second electrodes 105(A), 105 (B), 110 may be planar with each other, with the second electrode 110 surrounding an outer edge of each first electrode 105. For example, the first and second electrodes 105(A) 105(B), 110 may be situated on a single continuous surface, such as the horizontal surface of the substrate or a surface of the windshield 130.

Figure 6:
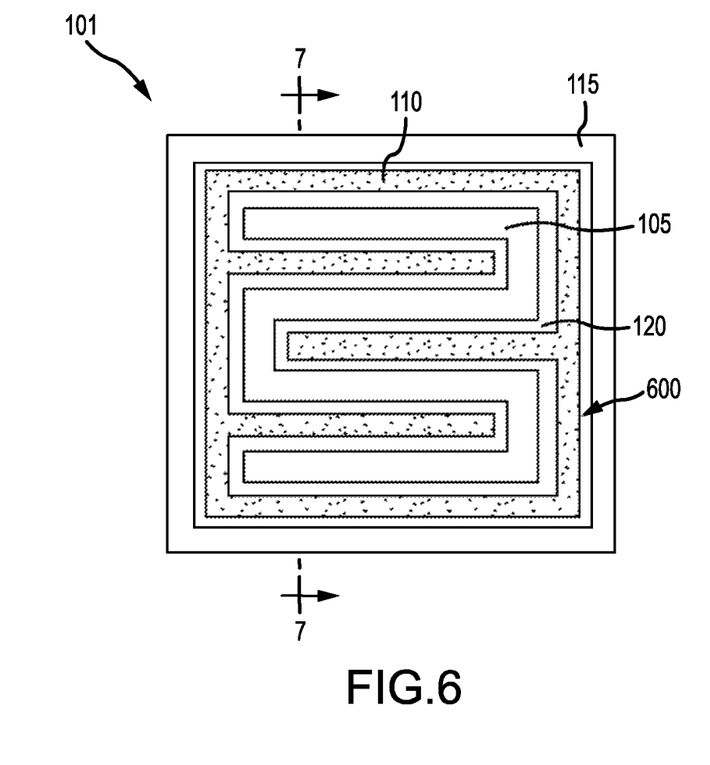
FIG. 6 representatively illustrates a top view of a capacitive sensor in accordance with a third embodiment of the present technology.
Figure 7:
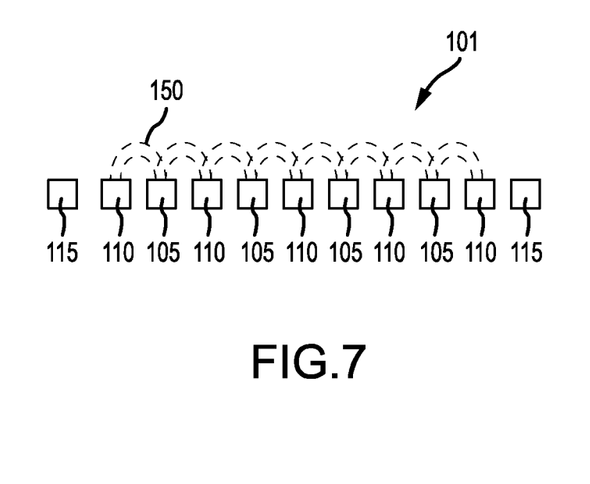
FIG. 7 representatively illustrates a cross-sectional view of the capacitive sensor of FIG. 6 in accordance with the present technology.

In a third embodiment, and referring to FIGS. 6 and 7, the first electrode 105 may comprise a continuous set of linear segments that may form a U-shape, an S-shape, multiple U-shapes connected together, and the like. The second electrode 110 forms a comb shape that surrounds and interleaves the first electrode 105. According to the present embodiment, the third electrode 115 is directly adjacent to and surrounds an outer perimeter 600 (i.e., outer edge) of the second electrode 110.

According to the present embodiment, the first electrode 105 may operate as the reception electrode, the second electrode 110 may operate as the drive electrode, and the third electrode 115 is connected to the ground potential. In addition, the first, second, and third electrodes 105, 110, 115 may be planar with each other. For example, the first, second, and third electrodes 105, 110, 115 may be formed directly on the horizontal surface of the substrate. In other words, the second electrode 110 is nested within an interior space defined by the third electrode 115, the first electrode 105 is nested within an interior space defined by the second electrode 110, and the first, second, and third electrodes 105, 110, 115 are situated on a single continuous surface, such as the horizontal surface of the substrate or a surface of the windshield 130.

Figure 8:
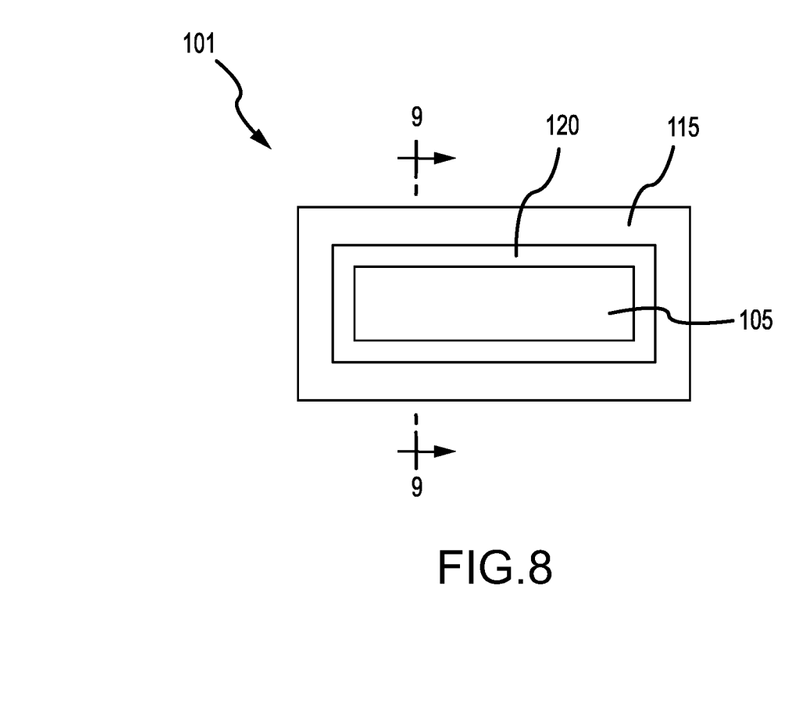
FIG. 8 representatively illustrates a top view of a capacitive sensor in accordance with a fourth embodiment of the present technology.
Figure 9:
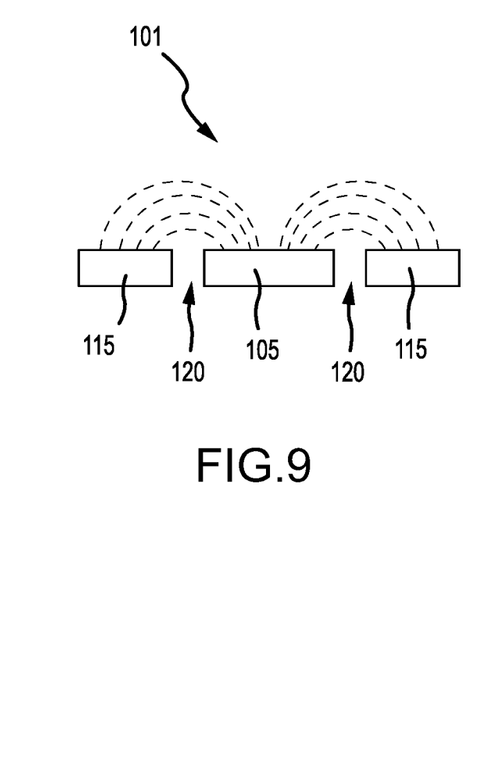
FIG. 9 representatively illustrates a cross-sectional view of the capacitive sensor of FIG. 8 in accordance with the present technology.

In a fourth embodiment, and referring to FIGS. 8 and 9, the capacitive sensor 101 may be configured as a self-sensing type capacitor, as opposed to a mutual-capacitance type sensing capacitor. According to the present embodiment, the capacitive sensor 101 comprises the first electrode 105 that operates as the reception electrode and the third electrode 115 that is connected to the ground potential. According to the present embodiment, the third electrode 115 is planar with and surrounds an outer edge of the first electrode 105. In other words, the first electrode 105 is nested within an interior space defined by the third electrode 115, and the first and third electrodes 105, 115 are situated on a single continuous surface, such as the horizontal surface of the substrate or a surface of the windshield 130.

The sensing circuit 135 may be responsive to the electric field 150 and configured to measure a capacitance and/or a change in capacitance of the capacitive sensor 101. For example, in a raining condition, third electrode 115 connects the rain to the ground potential resulting in a decrease in the capacitance of the capacitive sensor 101. The sensing circuit 135 may be configured to detect the decrease and/or an increase in capacitance of the capacitive sensor 101.

According to an exemplary embodiment, the sensing circuit 135 may comprise a differential amplifier 165 to measure and/or detect changes in the capacitance. For example, the differential amplifier 165 may comprise an inverting terminal (−) connected to the electrode operating as the reception electrode (e.g., the first electrode 105) and a non-inverting terminal (+) connected to a reference voltage, such as supplied by a voltage source 175. The differential amplifier 165 may be configured to measure or detect a voltage difference between the inverting and non-inverting terminals and generate an output voltage VOUT according to the voltage difference. The differential amplifier 165 may also apply a gain to the voltage difference.

The sensing circuit 135 may further comprise various circuits and/or systems to process, convert, and/or analyze the output voltage VOUT. For example, the sensing circuit 135 may comprise an analog-to-digital converter (ADC) 180 and a logic circuit 185.

According to an exemplary embodiment, the sensing circuit 135 may further comprise the variable capacitor 170 and the power source 160. The sensing circuit 135 may further comprise the inverter 155, which is connected between the power source 160 and the capacitive sensor 101.

The ADC 180 may be connected to an output terminal of the differential amplifier 165 and configured to convert the output voltage VOUT to a digital value (i.e., AD value). According to various embodiments, as the capacitance of the capacitive sensor 101 decreases, the corresponding digital value increases and vise versa. The ADC 180 may transmit the digital value to the logic circuit 185. The ADC 180 may comprise any signal converter suitable for converting an analog signal to a digital signal.

Figure 10:
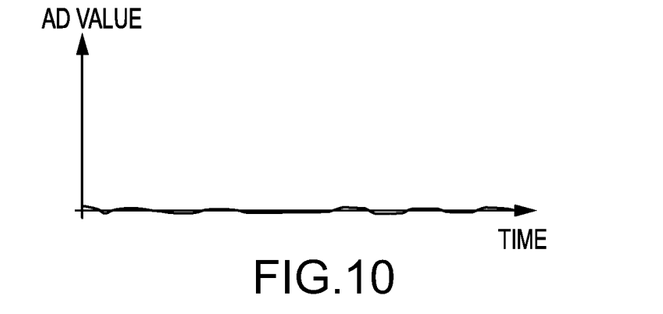
FIG. 10 graphically illustrates a digital output of a sensor circuit in the absence of rain in accordance with various embodiments of the present technology.
Figure 11:
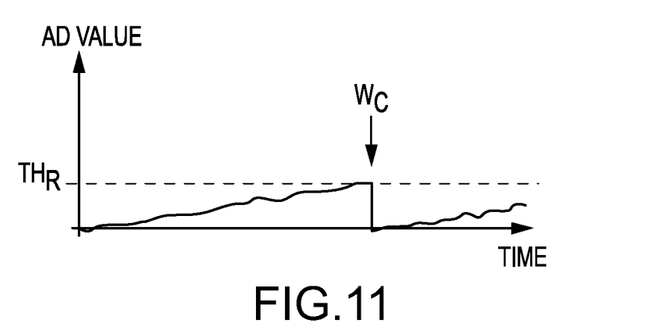
FIG. 11 graphically illustrates a digital output of a sensor circuit in a light rain condition in accordance with various embodiments of the present technology.
Figure 12:
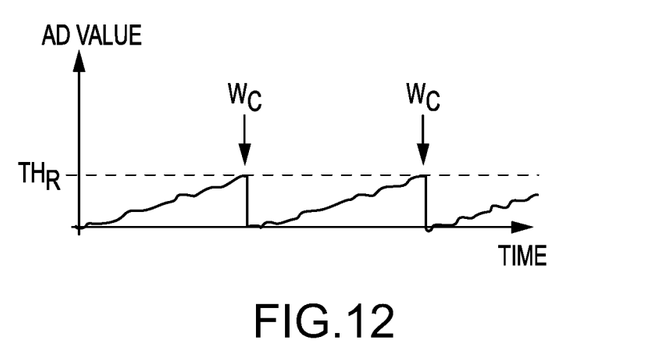
FIG. 12 graphically illustrates a digital output of a sensor circuit in a heavy rain condition in accordance with various embodiments of the present technology.

The logic circuit 185 may receive the digital value from the ADC 180, interpret the values, and perform an appropriate response and/or produce an appropriate output signal according to the digital value. According to various embodiments, the logic circuit 185 may be programmed with a predetermined threshold $TH_R$ (for example, as illustrated in FIGS. 10-12) that corresponds to a particular digital value. The logic circuit 185 may utilize the predetermined threshold $TH_R$ to detect the presence of rain. For example, the logic circuit 185 may compare the digital value from the ADC 180 with the predetermined threshold $TH_R$ and generate a logic signal corresponding to the comparison. The logic signal may have a first value (e.g., a digital value) if the digital value is less than the predetermined threshold $TH_R$ and may have a second value if the digital value is greater than or equal to the predetermined threshold $TH_R$. The first value may indicate an absence of rain and the second value may indicate a presence of rain. The logic circuit 185 may comprise any number of circuits, logic gates, and the like, that operate together to analyze the digital value and generate a signal according to the analysis.

The electronic control unit (ECU) 140 may be configured to receive an output signal from sensing circuit 135, such as the logic signal. The ECU 140 may utilize the logic signal to operate or otherwise control the windshield wiper 145 according to a control signal, such as a wiper signal Wc, to remove the rain (or other substance 125) from the windshield. For example, the ECU 140 may start or stop a wiping action (left to right motion) by the windshield wiper 145 and/or control a speed of the wiping action by the windshield wiper 145 by generating a wiper signal Wc to achieve the desired operation. The ECU 140 may be further configured to generate various signals that control other functions of the vehicle.

Referring to FIGS. 1A and 10-13, the sensing circuit 135 continuously monitors the capacitance of the capacitive sensor 101 and generates the logic signal according to the capacitance. The sensing circuit 135 may also continuously communicate with the ECU 140, so that when the sensing circuit 135 detects a change in capacitance, the ECU 140 may respond almost immediately. Accordingly, over a period of time, the sensing circuit 135 may generate a number of logic signals and transmit the logic signals to the ECU 140.

According to an exemplary operation, when a weather condition, such as rain, is present, the third electrode 115 connects the rain to the ground potential resulting in a decrease in capacitance and a corresponding increase in the digital value. If no rain is present, the capacitance of the sensing capacitor 101 and corresponding digital value remain substantially constant (e.g., as illustrated in FIG. 10).

Figure 13:
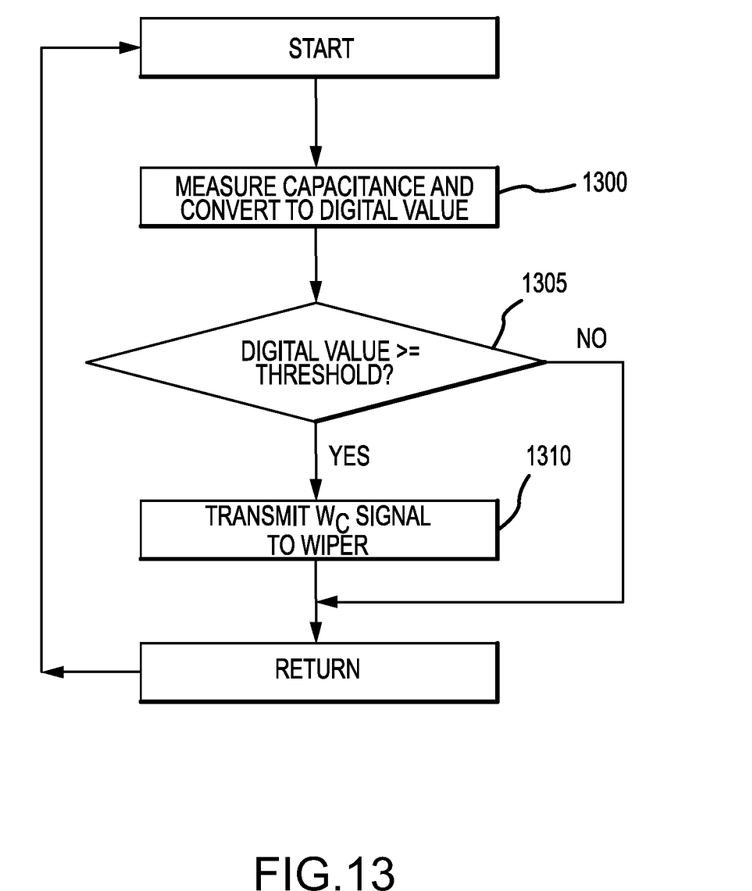
FIG. 13 is a flowchart for operating the system of FIG. 1 in accordance with the present technology.

In an exemplary operation, and referring to FIG. 13, the sensing circuit 135 may measure the capacitance of the sensing capacitor 101 and convert the capacitance into the digital value (1300) using the differential amplifier 165 and the ADC 180. The logic circuit 185 may then compare the digital value to the predetermined threshold $TH_R$ (1305). If the digital value is greater than or equal to the predetermined threshold $TH_R$, the logic circuit 185 communicates this condition to the ECU 140 and then the ECU 140 may transmit the wiper signal Wc to operate and/or control the windshield wiper 145 (1310). If the digital value is less than the predetermined threshold $TH_R$, the logic circuit 185 communicates this condition to the ECU 140 and the wiper signal Wc is not sent to the windshield wiper 145. The sensing circuit 135 may continuously monitor the capacitance of the capacitive sensor 101 and report the digital value to the logic circuit 185.

During a raining condition, and at the time the ECU 140 deploys the wiper signal Wc, the windshield wiper 145 removes the rain resulting in a decrease in the digital value. As rain continues to collect again, the digital value begins to increase until the digital value reaches the predetermined threshold $TH_R$ again. A heavy rain condition (e.g. as illustrated in FIG. 12) will trigger the wiper signal Wc with a greater frequency than a light rain condition (e.g., as illustrated in FIG. 11). Accordingly, the speed and/or frequency of the wiping action are directly related to the amount of rain.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A capacitive sensor capable of detecting a liquid, comprising:
   a first electrode;
   a single, continuous second electrode arranged planar with and surrounding the first electrode, wherein the first and second electrodes form a sensing capacitor; and
   a single, continuous third electrode connected to a ground potential, wherein the third electrode:
      is planar with the first and second electrodes;
      adjacent to an outer edge of the second electrode; and
      surrounds the first and second electrodes.

2. The capacitive sensor according to claim 1, wherein the first electrode comprises a reception electrode.

3. The capacitive sensor according to claim 1, wherein the second electrode comprises a drive electrode connected to a voltage source.

4. The capacitive sensor according to claim 1, wherein the second electrode arranged is concentric with the first electrode.

5. The capacitive sensor according to claim 4, wherein the third electrode is arranged concentric with the first and second electrodes.

6. The capacitive sensor according to claim 1, wherein the first electrode comprises a set of continuous linear segments.

7. The capacitive sensor according to claim 6, wherein the second electrode is arranged to form a comb-shape that interleaves the first electrode.

8. The capacitive sensor according to claim 1, wherein the third electrode surrounds the outer edge of the second electrode.

9. The capacitive sensor according to claim 1, wherein the third electrode is configured to couple the liquid, which is adjacent to a surface of the third electrode, to the ground potential.

10. A method for detecting rain using a capacitive sensor, comprising:
    forming the capacitive sensor comprising:
       a first electrode;
       a single, continuous second electrode arranged planar with and surrounding the first electrode, wherein the first and second electrodes form a sensing capacitor; and
       a single, continuous third electrode planar with and surrounding the first and second electrodes and connected to a common ground having a fixed ground potential;
    electrically coupling the rain to the ground potential via the second electrode and the third electrode;
    measuring a capacitance of the sensing capacitor;
    converting the capacitance to a digital value;
    comparing the digital value to a predetermined threshold value; and
    generating a logic signal according to the comparison;
    wherein:
       the logic signal is a first value if the digital value is less than the threshold value and indicates an absence of rain; and
       the logic signal is a second value if the digital value is greater than or equal to the threshold value and indicates a presence of rain.

11. The method according to claim 10, wherein:
    the second electrode arranged is concentric with the first electrode; and
    the third electrode is arranged concentric with the first and second electrodes and directly adjacent to the second electrode.

12. The method according to claim 10, wherein:
    the second electrode is arranged to form a comb-shape;
    the first electrode is nested within the second electrode; and
    the third electrode is directly adjacent to and surrounds an outer perimeter of the second electrode.

13. The method according to claim 10, wherein:
    the first electrode comprises a reception electrode; and
    the second electrode comprises a drive electrode connected to a voltage source.

14. The method according to claim 10, wherein:
    the first electrode is configured to operate as one of a reception electrode and a drive electrode; and
    the second electrode is configured to operate as one of the reception electrode and the drive electrode.

15. A system for detecting rain on a surface, comprising:
    a capacitive sensor affixed to the surface and comprising:
       a first electrode;
       a single, continuous second electrode arranged planar with and surrounding the first electrode, wherein the first and second electrodes form a sensing capacitor; and
       a single, continuous third electrode connected to a common ground having a fixed ground potential, wherein the third electrode is planar with and surrounding the first and second electrodes;
    a sensing circuit connected to the capacitive sensor and configured to:
       measure a capacitance of the sensing capacitor;
       convert the capacitance to a digital value;
       compare the digital value to a threshold value;
       generate a logic signal according to the comparison;
       wherein:
          the logic signal is a first value if the digital value is less than the threshold value and indicates an absence of rain; and the logic signal is a second value if the digital value is greater than or equal to the threshold value and indicates a presence of rain; and a control circuit connected to an output terminal of the sensing circuit and configured to:
receive the logic signal; and
generate a control signal according to the logic signal, wherein the control signal controls an operation to remove the rain from the surface.

16. The system according to claim 15, wherein the third electrode is configured to couple the rain to the ground potential.

17. The system according to claim 15, wherein:
the second electrode arranged is concentric with the first electrode and surrounds an outer perimeter of the first electrode; and
the third electrode is arranged concentric with the first and second electrodes and surrounds an outer perimeter of the second electrode.

18. The system according to claim 15, wherein:
the second electrode comprises a comb-shape that interleaves the first electrode; and
the first electrode is nested within the second electrode.

19. The system according to claim 15, wherein:
the first electrode comprises a reception electrode; and
the second electrode comprises a drive electrode connected to a voltage source.

20. The system according claim 15, wherein:
the first electrode is configured to operate as one of a reception electrode and a drive electrode; and
the second electrode is configured to operate as one of the reception electrode and the drive electrode.

* * * * *